United States Patent
Koike et al.

[11] Patent Number: 5,871,199
[45] Date of Patent: Feb. 16, 1999

[54] VIBRATION INSULATING PAD

[75] Inventors: Masayuki Koike; Keiko Furukawa, both of Yokohama, Japan

[73] Assignee: Nissan Motor Co., Ltd., Kanagawa, Japan

[21] Appl. No.: 858,761

[22] Filed: May 19, 1997

Related U.S. Application Data

[63] Continuation of Ser. No. 209,047, Mar. 11, 1994, abandoned.

[30] Foreign Application Priority Data

Mar. 17, 1993 [JP] Japan .................................. 5-057247

[51] Int. Cl.[6] ...................................................... F16F 1/36
[52] U.S. Cl. ............................................ 248/638; 248/615
[58] Field of Search ..................................... 248/615, 638

[56] References Cited

U.S. PATENT DOCUMENTS

| | | | |
|---|---|---|---|
| 2,291,430 | 7/1942 | Ingersoll | 248/56 X |
| 4,640,479 | 2/1987 | Shely | 248/56 |
| 4,718,631 | 1/1988 | Reynolds et al. | 248/615 |

FOREIGN PATENT DOCUMENTS

| | | | |
|---|---|---|---|
| 020790 A1 | 6/1979 | European Pat. Off. | |
| 385858 | 9/1990 | European Pat. Off. | 411/514 |
| 416991 A1 | 3/1991 | European Pat. Off. | |
| 1452293 | 9/1966 | France | 411/513 |
| 424233 | 2/1935 | United Kingdom . | |
| 1132637 | 11/1968 | United Kingdom . | |
| 1132954 | 11/1968 | United Kingdom . | |
| 1187788 | 4/1970 | United Kingdom | 248/615 |
| 1248977 | 10/1971 | United Kingdom . | |
| 1271400 | 4/1972 | United Kingdom . | |
| 1327682 | 9/1973 | United Kingdom . | |
| 1557747 | 12/1979 | United Kingdom . | |
| WO 90/07658 | 7/1990 | WIPO . | |

OTHER PUBLICATIONS

Spiroipin Publication, C.E.M Company, Danielson, Conn. date stamped by USPTO Feb. 18, 1955.

*Primary Examiner*—Alvin Chin-Shue
*Attorney, Agent, or Firm*—McDermott, Will & Emery

[57] ABSTRACT

A vibration insulating pad through which a center member is elastically connected to a vehicle body in an automotive vehicle. The vibration insulating pad is formed of rubber and to be disposed in an installation hole formed in the center member. The vibration insulating pad comprises a head section and a body section which are coaxially integral with each other through a neck section. A generally annular groove is formed between the head and body sections and around the neck section. An axially extending central through-hole is formed throughout the head, neck and body sections. Additionally, an axially extending slit is continuously formed extending from the inner to outer surfaces of the pad. The slit is located generally tangential with respect to the through-hole thereby facilitating deforming the pad long and narrow by hands of an operator prior to the installation operation for the pad.

9 Claims, 8 Drawing Sheets

VIBRATION INSULATING PAD

This application is a continuation of application Ser. No. 08/209,047 filed Mar. 11, 1994, abandoned.

BACKGROUND OF THE INVENTION

1. Field of the Invention

This invention relates to improvements in a vibration insulating pad through which two vibratory members are supportingly connected, and more particularly to such a vibration insulating pad which is formed of rubber and disposed in a hole formed in a member for supporting a power unit of an automotive vehicle.

2. Description of the Prior Art

It is well known that there are automotive vehicles provided with a center member on which a power unit is supported. The center member is disposed extending in the fore-and-aft direction of the automotive vehicle and elastically supported through vibration insulating pads to a vehicle body or frame. Each vibration insulating pad is fitted in an installation hole formed in the center member.

The vibrating insulating pad is formed of rubber and generally cylindrical so as to be formed with an axially extending through-hole. The pad includes head, neck and body sections. The head section is formed tapered to facilitate installation of the pad in the installation hole of the center member. A generally annular groove is formed between the head and body section and around the neck section.

However, difficulties have been encountered in the above conventional vibration insulating pad as discussed below. The vibration insulating pad is relatively low in spring constant to obtain a sufficient vibration insulating effect, which requires making the pad large-sized to meet a necessary durability of the pad. Thus, the head section is considerably larger in diameter than the installation hole of the center member and therefore it is impossible to install the pad into the installation hole even upon deforming it by hands of an operator. In this regard, a pad press-fitting facility such as an air cylinder is required for the installation operation for the pad. This is disadvantageous from the view points of reducing the number of steps in a production process and of production cost for a power unit supporting system.

SUMMARY OF THE INVENTION

It is an object of the present invention to provide an improved vibration insulating pad which can effectively overcome drawbacks encountered in conventional vibration insulating pads.

Another object of the present invention is to provide an improved vibration insulating pad which can be installed to a predetermined position by hands of an operator without using any press-fitting facility for the pad.

A further object of the present invention is to provide an improved vibration insulating pad which can be easily manually fitted in an installation hole which has a diameter considerably small as compared with the outer diameter of the pad.

A still further object of the present invention is to provide an improved vibration insulating pad which can be easily manually fitted in an installation hole even if the pad takes a variety of shapes other than a generally cylindrical shape.

A vibration insulating pad of the present invention is formed of rubber and comprising a generally circular head section. A generally cylindrical neck section is coaxial and integral with the head section. A generally cylindrical body section is coaxial and integral with the neck section. A generally annular groove is formed between the head and body section and around the neck section. An axially extending central through-hole is formed coaxial and extends axially throughout the head; neck and body sections. The central through-hole is defined by an inner surface of the pad. An axially extending slit continuously extends from the inner surface to an outer surface of the pad. The slit is defined by first and second end faces forming part of the pad, in which at least one of the first and second end faces is generally parallel with and spaced from a vertical plane containing an axis of the pad.

The thus arranged vibration insulating pad is installed to an installation hole of a member in the following manner: First, the pad is twisted vertically around the axially central portion of the slit so that the end faces respectively displace upwardly and downwardly. This twisting action is continued until the end faces are axially separate from each other. Then, the pad is twisted around its axis until the end faces peripherally displace and take a condition that end faces are located peripherally opposite relative to their initial positions, upon which a part of the upper end of the head section is caught by a part of the lower end of the body section. Accordingly, the pad is maintained at its twisted condition. Subsequently, the thus twisted pad is inserted into the installation hole and rotated upon the groove fitting to a peripheral portion defining the installation hole. Lastly, the part of the upper end of the head section caught by the part of the lower end of the body section is pushed inside and then outside. Accordingly, the twisted pad is restored to its initial state thus completing the installation operation of the pad to the installation hole.

Thus, the vibration insulating pad can be easily installed or fitted in an installation hole by the hands of the operator without using any press-fitting facility such as an air cylinder, thus facilitating the installation operation for the pad and lowering the production cost of a vehicular power unit supporting system.

BRIEF DESCRIPTION OF THE DRAWINGS

In the drawings, like reference numerals designate like elements and parts throughout all figures, in which.

DETAILED DESCRIPTION OF THE INVENTION

Figure 4:
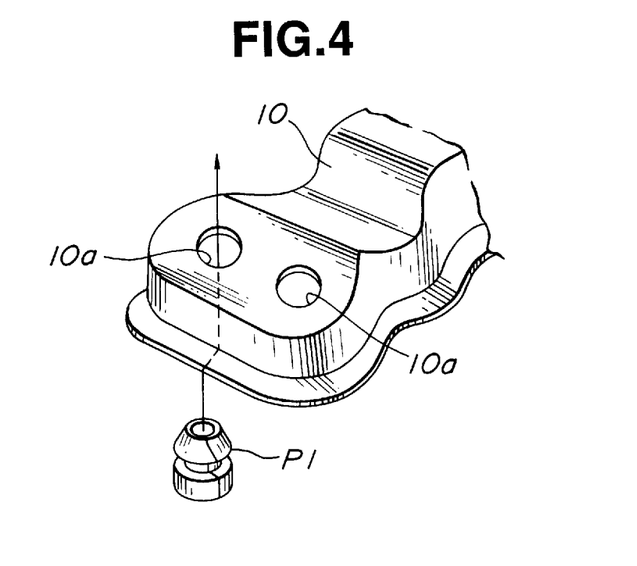
FIG. 4 is an illustration showing a condition in which the vibration insulating pad of FIG. 1 is to be installed to a center member.
Figure 5:
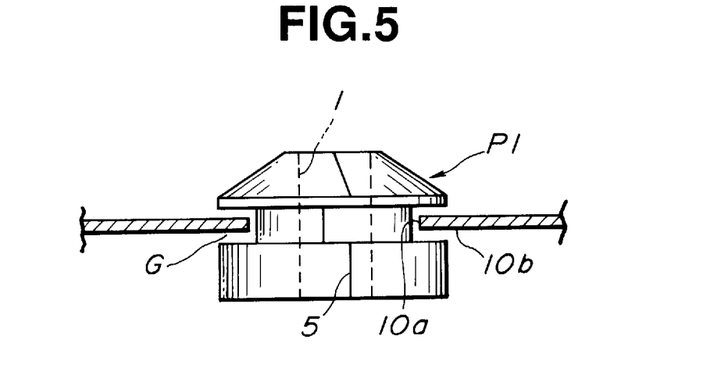
FIG. 5 is an illustration showing a condition in which the vibration insulating pad of FIG. 1 has been installed to the center member.

Referring now to FIGS. 1 to 5, an embodiment of a vibration insulating pad of the present invention is illustrated by the reference character P1. As shown in FIGS. 4 and 5, the vibration insulating pad P1 of this embodiment is used to be fitted in an installation hole 10a formed through a wall of a center member 10 of an automotive vehicle (not shown). The center member 10 is located extending in the fore-and-aft direction of the vehicle and supported through the vibration insulating pad P1 to a vehicle body or frame (not shown). A power unit including an engine and a transmission is supported on the center member though not shown.

Figure 1:
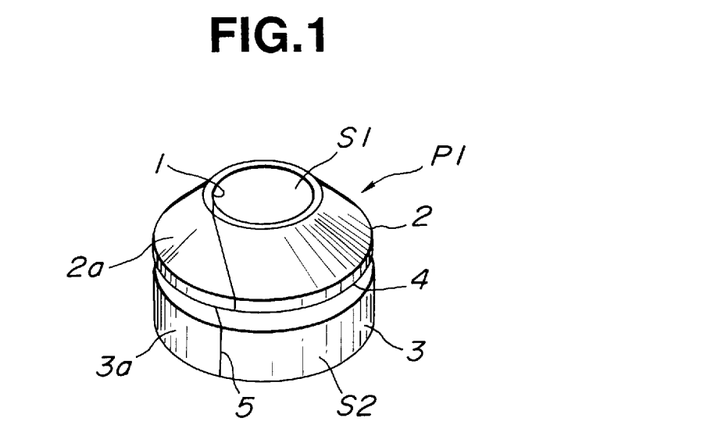
FIG. 1 is a perspective view of an embodiment of a vibration insulating pad according to the present invention.

The vibration insulating pad P1 is formed of rubber or elastomeric material and formed generally cylindrical to have a generally cylindrical axially extending central through-hole 1 in which a bolt (not shown) is disposed to connect the center member 10 to the vehicle body through the vibration insulating pad P1. The vibration insulating pad P1 comprises a generally frusto-conical head section 2 which is formed with a through-hole 1a forming part of the central through-hole 1.

The through-hole 1a is coaxial with the head section 2. The head section 2 is formed with a frusto-conical surface 2a which is tapered toward the free or upper end (not identified) of the head section 2. A flat cylindrical neck section 4 is integral at its upper end with the lower end of the head section 2 and located coaxial with the head section 2. The neck section 4 is formed with a through-hole 1b forming part of the axially extending central through-hole 1, and has an outer diameter smaller than the outer diameter of the head section 2. Additionally, a generally cylindrical body section 3 is integral at its upper end with the lower end of the neck section 4 and located coaxial with the neck section 4. The body section 3 is formed with a through-hole 1c forming part of the axially extending central through-hole 1, and formed with a cylindrical peripheral surface 3a whose outer diameter is larger than that of the neck section 4 and generally equal to that of the head section 2. It will be understood that the through-holes 1a, 1b, 1c have the same diameter and coaxial and axially aligned with each other to form the axially extending central through-hole 1. It will be understood that the axially extending central through-hole 1 is defined by the inner surface S1 of the pad P1.

The head section 2 is formed at its lower end with an annular flat face 2b which is perpendicular to the center axis A of the pad P1 and extends radially outwardly from the outer peripheral surface of the neck section 4. The body section 3 is formed at its upper end with an annular flat face 3b which is parallel with the annular flat face 2b of the head section 2 and. extends radially outwardly from the outer peripheral surface of the neck section 4. A generally annular groove G is defined by the flat faces 2b, 3b and the outer peripheral surface of the neck section 4. It will be understood that the a peripheral portion 10b (defining the installation hole 10a) of the center member 10 is fitted in the annular groove G as shown in FIG. 5.

Figure 2:
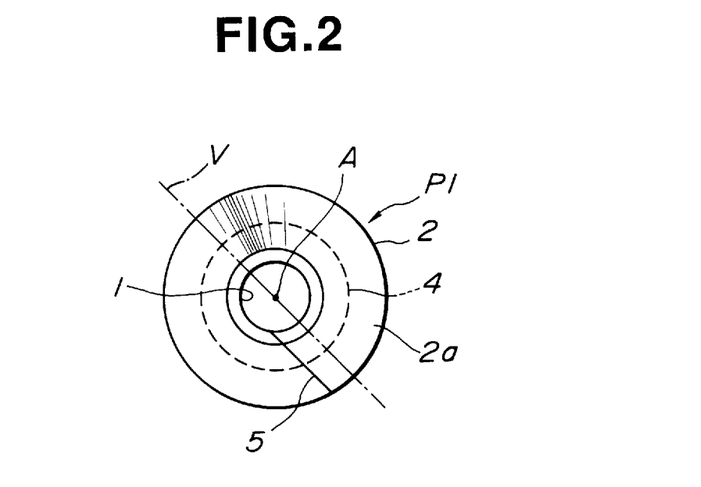
FIG. 2 is a plan view of the vibration insulating pad of FIG. 1.
Figure 3:
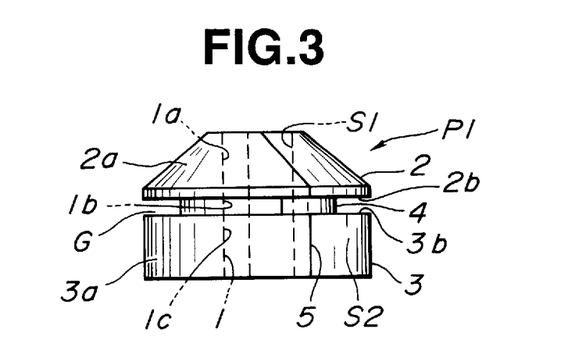
FIG. 3 is a side view of the vibration insulating pad of FIG. 1.
Figure 6:
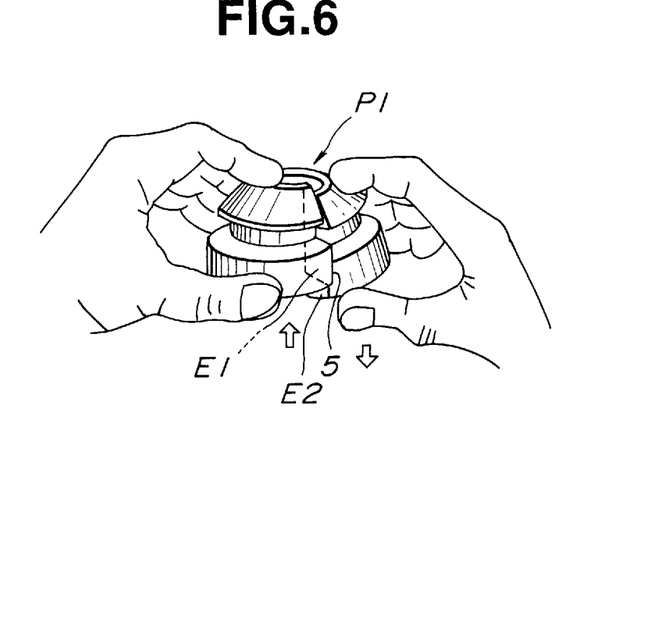
FIG. 6 is an illustration showing a condition in which the vibration insulating pad of FIG. 1 is vertically twisted around the axially central portion of a slit.
Figure 7:
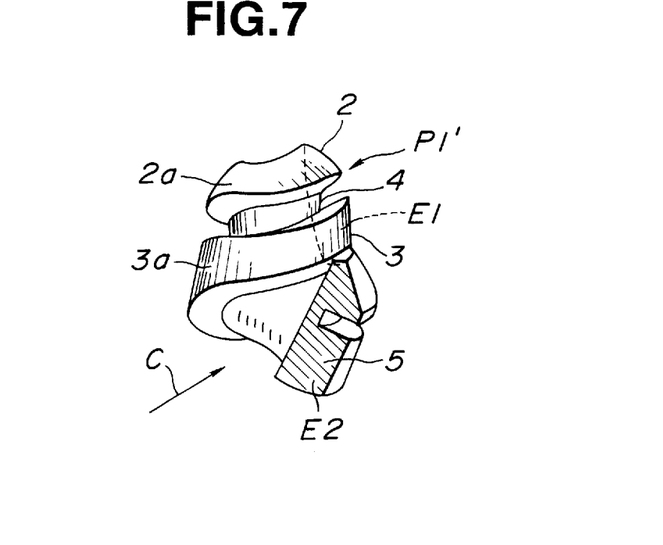
FIG. 7 is a perspective view of the vibration insulating pad of FIG. 1 in its twisted state in which the pad has been also twisted around its axis.

An axially extending slit 5 is formed in the vibration insulating pad P1 in such a manner as to extend from the outer surface S2 to the inner surface S1 of the pad P1, so that the generally cylindrical pad P1 has peripherally opposite end faces E1, E2 which define the slit 5, as shown in FIGS. 6 and 7. It will be understood that the end faces E1, E2 face to each other and may be in contact with each other in a state of FIGS. 1 to 5. It is to be noted that the slit 5 extends parallel with an imaginary vertical plane V (shown in FIG. 2) which contains the center axis A of the pad P1, and located slightly spaced from the vertical plane V. In other words, the slit 5 is formed generally tangential relative to the axially extending central through-hole 1 particularly as viewed from the direction of the axis A as illustrated in FIG. 2.

The manner of installation of the above vibration insulating pad P1 to the center member 10 will be discussed hereinafter in the order of steps of an installatin process with reference to FIGS. 6 to 12.

First, the vibration insulating pad P1 is twisted vertically around the central portion of the slit 5 by hands of an operator so that the end faces E1, E2 respectively displace upwardly and downwardly or in opposite directions to each other as indicated by arrows in FIG. 6. This twisting action is continued until the end faces E1, E2 are brought into such a condition as to be axially separate from each other so that a part of the upper end of the head section 2 is below a part of the lower end of the body section 3.

Figure 8:
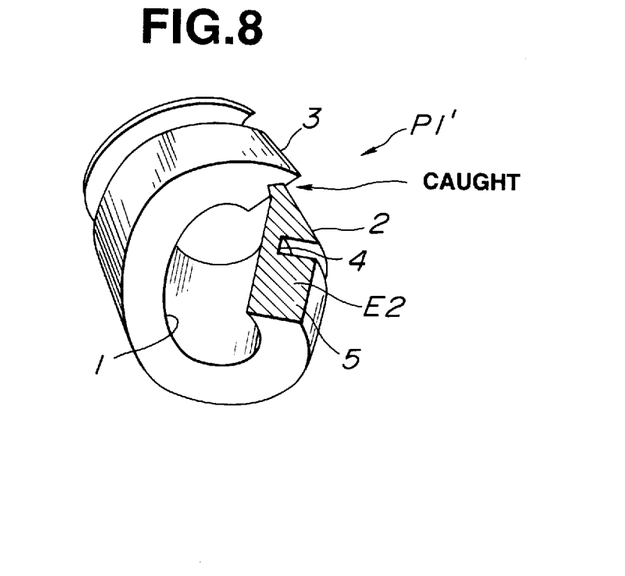
FIG. 8 is a perspective view of the vibration insulating pad as viewed from the direction of an arrow C in FIG. 7.

Then, as shown in FIG. 7, the pad P1 is twisted around its axis until the the end faces E1, E2 are peripherally displaced and brought into such a such a condition that the end faces E1, E2 are respectively positioned at opposite sides relative to their initial positions shown in FIG. 6. At this condition, the operator releases his hands from the thus twisted pad P1, upon which the part of the upper end of the head section 2 is caught by the part of the lower end of the body section 3. As a result, the pad P1 is maintained at its vertically twisted state thereby forming a twisted vibration insulating pad P1' as shown in FIGS. 7 and 8. In this state, the groove G between the head and body sections 2, 3 takes a helical form.

Figure 9:
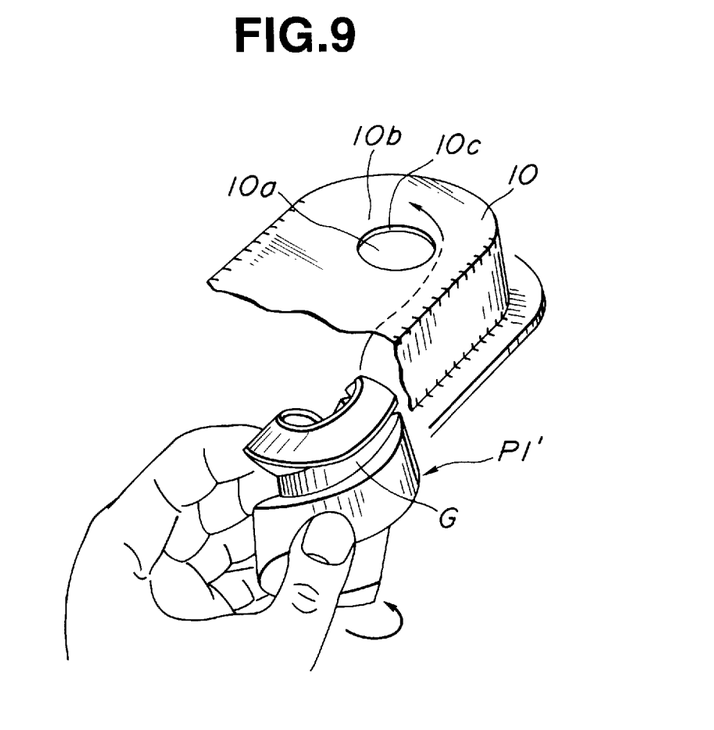
FIG. 9 is a perspective view showing a condition in which the vibration insulating pad of FIG. 1 is to be installed to the center member.
Figure 10:
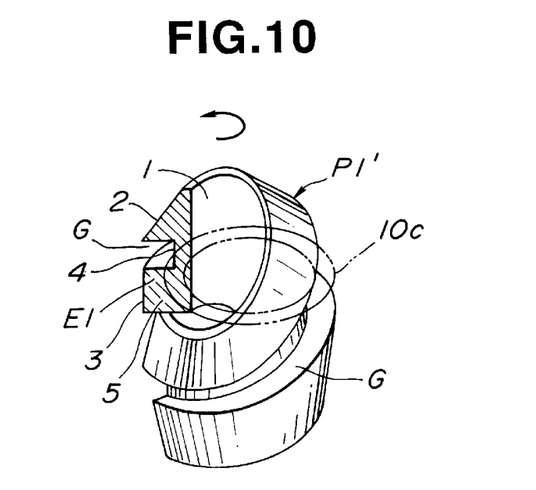
FIG. 10 is a perspective view showing a state in which the vibration insulating pad of FIG. 1 is being inserted into the installation hole of the center member upon being screwed.

Subsequently, as shown in FIG. 9, the tip end portion (defined by the end face E1) of the head section 2 of the twisted pad P1' is inserted into the installation hole 10a of the center member 10, and then the tip end part of the groove G is fitted to the inner edge 10c of the peripheral portion 10b defining the installation opening 10a by the hand of the operator. The twisted pad P1' is rotated under a state in which the groove G and the peripheral portion inner edge 10c are being fitted with each other, as shown in FIG. 10.

Under the screwing action of the twisted pad P1', the twisted pad P1' is gradually upwardly displaced relative to the inner edge 10c defining the installation hole 10a of the center member 10 so that the upper part of the twisted pad P1' is reached to a set state while the lower part of the same is left at a unset state.

Figure 11:
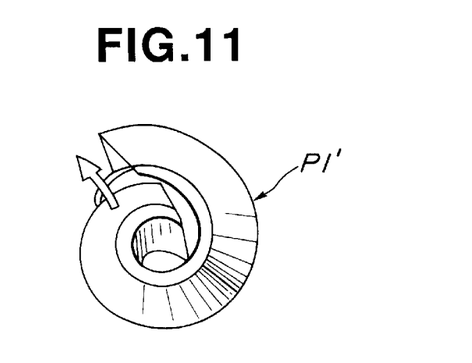
FIG. 11 is a perspective view showing a state in which the vibration insulating pad at its twisted state is to be restored to its original state.
Figure 12:
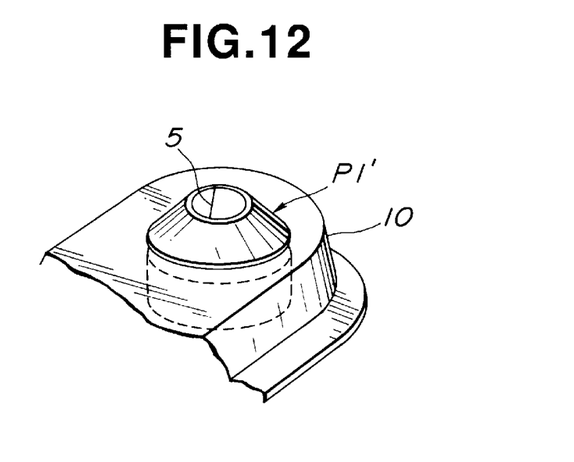
FIG. 12 is a fragmentary perspective view showing a condition in which the vibration insulating pad has been installed in position of the center member.
Figure 13:
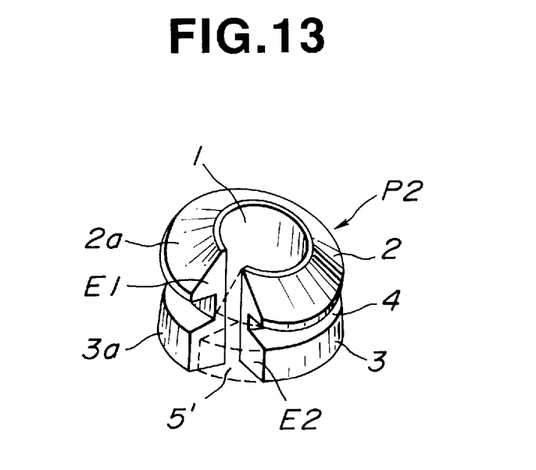
FIG. 13 is a perspective view of another embodiment of the vibration insulating pad according to the present invention.
Figure 14:
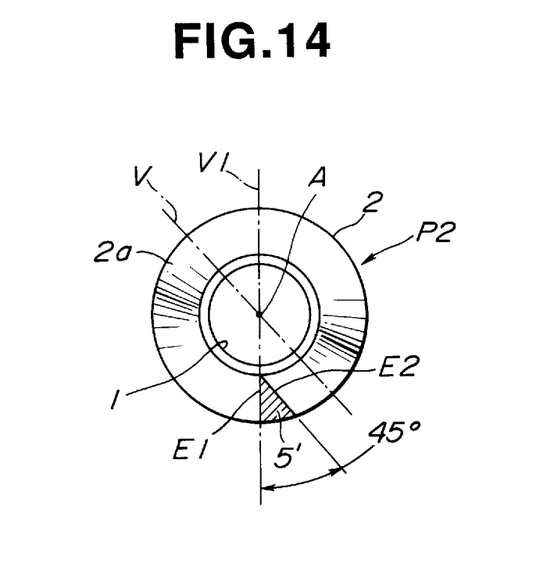
FIG. 14 is a plan view of the vibration insulating pad of FIG. 13.

Lastly, as shown in FIG. 11, the part of upper end of the head section 2 caught by the part of the lower end of the body section 3 is pushed inside and then outside, and accordingly the twisted pad P1' is restored to its initial shape under the action of a rubber elasticity thereby forming the pad P1 as shown in FIG. 12, thus completing the installation operation of the vibration insulating pad P1 to the installation hole 10a of the center member 10.

Next, reasons why the slit 5 is positioned generally tangentially relative to the axially extending central through-hole 1 will be discussed.

If the slit 5 is formed not generally tangential or on the vertical plane V (in FIG. 2), the following drawbacks are encountered: Even though the pad P1 is twisted around the central portion of the slit 5 as shown in FIG. 6 and then twisted around its axis A in the manner shown in FIG. 7, the part of the upper end of the head section 2 cannot be caught by the part of the lower end of the body section 3. As a result, the pad P1' in the twisted state as shown in FIGS. 7 and 8 cannot be obtained. Additionally, when the part of the upper end of the head section 2 caught by the part of the lower end of the body section 3 is pushed inside and then outside lastly in the manner shown in FIG. 11, the end faces E1, E2 defining the slit 5 interfere with each other and therefore the caught part of the upper end of the head section 2 cannot be moved outside.

As appreciated from the above, the vibration insulating pad P1 of the embodiment can be easily installed or fitted in an installation hole by hands of an operator without using any press-fitting facility such as an air cylinder, thus facilitating the installation operation for the pad and lowering the production cost of a vehicular power unit supporting system.

FIGS. 13 to 16 illustrate another embodiment of the vibration insulating pad P2 of the present invention, which is similar to the pad P1 of the embodiment of FIGS. 1 to 12 except for the shape of the axially extending slit 5'. In this embodiment, the slit 5' is of an axially extending cutout of the generally wedge-shape. More specifically, as best seen from FIG. 14, the slit or cutout 5' is defined by the end faces E1, E2 of the pad P2. The end face E1 is generally in an imaginary vertical plane V1 containing the axis A, and therefore extends generally radially outwardly. The end face E2 is parallel with and spaced from the vertical plane V containing the axis A. The vertical planes V1 and V form therebetween an angle of 45°, so that the end faces E1, E2 form therebewteen the same angle. Thus, the generally cylindrical vibration insulating pad P2 of this embodiment takes the form wherein a generally wedge-shaped part 5' is cut out.

Figure 16:
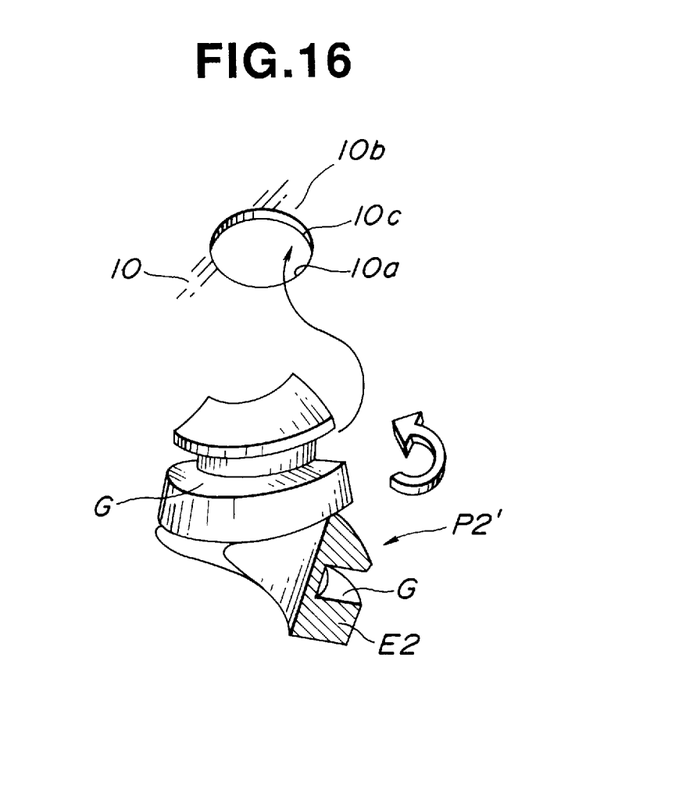
FIG. 16 is an illustration showing a condition in which the vibration insulating pad of FIG. 13 is manually installed in position of a center member.

The vibration insulating pad P2 of this embodiment is installed into the installation hole 10a in a similar manner to that in the embodiment of FIGS. 1 to 12, as follows: As shown in FIG. 16, after the pad P2 is twisted to take its twisted state P2', the twisted pad P2' is inserted into the installation hole upon the groove 4 being in engagement with the edge 10c defining the installation hole 10a of the center member 10. Under the screwing action, the twisted pad P2' is gradually moved upwardly and deeply inserted in the installation hole 10a.

By virtue of the slit or cutout 5', the amount of twist of the pad 5' around the axis is large as compared with that in the embodiment of FIGS. 1 to 12, so that the outer diameter of the twisted pad P2' is reduced thereby further facilitating the installation operation for the pad P2 into the installation hole 10a.

Figure 17A:
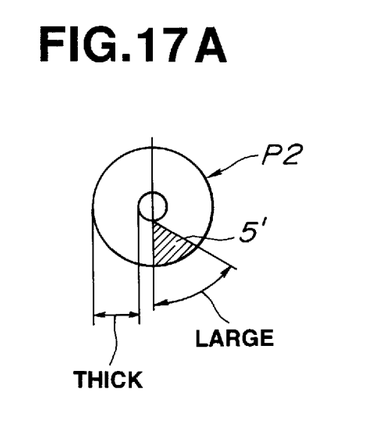
FIG. 17A is a plan view of an example of the vibration insulating pad, similar to the pad of FIG. 13.
Figure 17B:
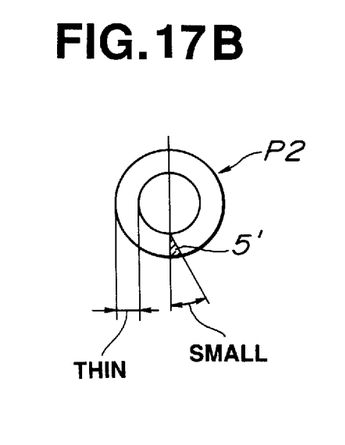
FIG. 17B is a plan view similar to FIG. 17A but showing another example.

In this regard, in case that the head section 2 of the pad P2 has an outer diameter considerably larger than the diameter of the installation hole 10a and additionally is considerably large in radial thickness, the volume of the cutout 5' is set considerably large as shown in FIG. 17A thereby allowing the pad to be manually installed in position. In case of the head section 2 has an outer diameter not so larger than the diameter of the installation hole 10a and additionally is small in radial thickness, the volume of the cutout 5' is set small as shown in FIG. 17B thereby allowing the pad P2 to be manually installed in position.

Figure 18:
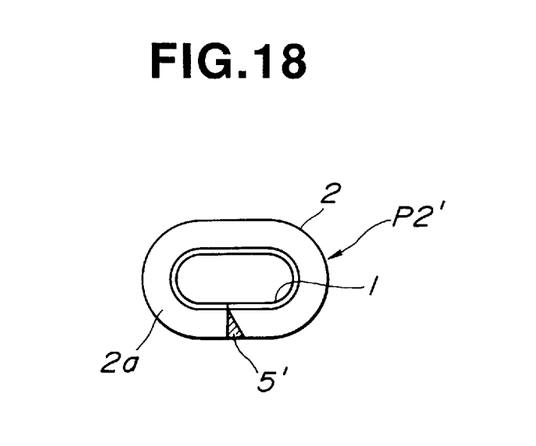
FIG. 18 is a plan view of a modified example of the vibration insulating pad of FIG. 13.

FIG. 18 illustrates a modified example of the vibration insulating pad P2' of the embodiment of FIGS. 13 to 17B. The vibration insulating pad P2' of this example is similar to that of the embodiment of FIGS. 13 to 17B except for the shape of the cross-section perpendicular to the axis thereof. The pad P2' is generally oval-shaped in cross-section and formed with the generally wedge-shaped slit or cutout 5'. It will be understood from this example that pads having a variety of cross-sectional shapes other than a circular shape can be easily manually installed in position by virtue of the slit or cutout 5'.

Figure 15:
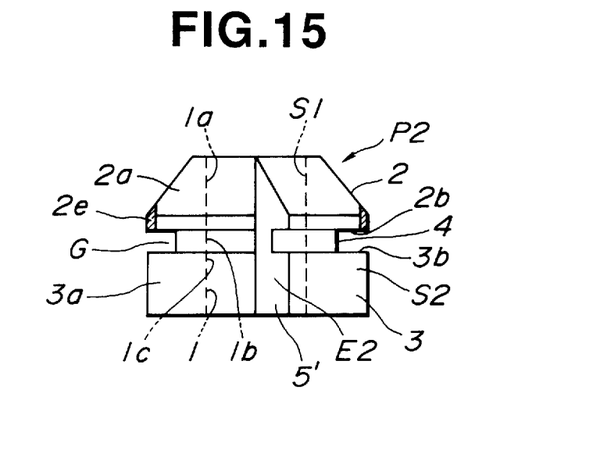
FIG. 15 is a side view of the vibration insulating pad of FIG. 13.

While preferred embodiments have been described, variations thereto will occur to those skilled in the art within the scope of the present inventive concepts which are delineated by the following claims. For example, in order to further facilitate the installation operation of the vibration insulating pad P1, P2, P2', it will be appreciated that the peripheral edge portion 2e may be cut out to reduce the outer diameter of the head section 2 as shown in FIG. 15, or otherwise the outer periphery of the head section 2 may be partly formed arcuate.

What is claimed is:

1. A vibration insulating pad formed of rubber and comprising:
   a generally circular head section;
   a generally cylindrical neck section which is coaxial and integral with said head section;
   a generally cylindrical body section which is coaxial and integral with said neck section;
   means defining a generally annular groove between said head and body section and around said neck section;
   means defining an axially extending central through-hole which is formed coaxial and extends axially throughout said head, neck and body sections, said central through-hole being defined by an inner surface of said pad; and
   means defining an axially extending slit which continuously extends from the inner surface to an outer surface of said pad, said slit defining means including means defining first and second end faces of said pad, said first and second end faces being generally parallel wit and spaced from a first vertical plane containing an axis of said pad, said first and second end faces normally being in contact;
   wherein the pad in a deformed state has an upper end of one of said first and second end faces disposed below and engaging a lower end of the other of said first and second end faces.

2. A vibration insulating pad as claimed in claim 1, wherein said head section has a generally frustoconical surface forming part of the outer surface of said pad, the frustoconical surface being coaxial with said head section.

3. A vibration insulating pad as claimed in claim 1, wherein said pad is annular in cross-section perpendicular to the axis of said pad.

4. A vibration insulating pad as claimed in claim 1, wherein said pad is generally oval-shape in cross-section perpendicular to the axis of said pad.

5. A vibration insulating pad as set forth inn claim 1, wherein the upper end of the one of said first and second end faces comprises means for temporarily locking the lower end of the other of said first and second end faces to temporarily lock said pad in a deformed configuration.

6. A vibration insulating pad as set forth in claim 5, wherein the pad is adapted for disposition in an opening formed in a structural member, and wherein, in the deformed state, the pad is constructed to assume an essentially helical configuration which facilitates its insertion into the opening.

7. A vibration insulating pad formed of rubber and comprising:

a shaped, generally cylindrical body having an axially extending essentially coaxial through-hole, said body having a head section, a neck section that is coaxial and integral with said head section, and a body section that is coaxial and integral with said neck section, said body including a generally annular groove between said head section and said body section and around said neck section;

an axially extending slit which continuously extends from the through hole to an outer surface of said pad, said slit defining first and second end faces in said pad, said first and second end faces being generally parallel with and spaced from a first vertical plane containing an axis of the through hole; and means for facilitating insertion of said pad into the opening in a deformed state, comprising: an upper edge portion of one of said first and second end faces which is, upon resilient distortion of the pad which moves the first and second end faces in opposite directions essentially in the direction of the first vertical plane, temporarily engaged with and disposed below a lower surface portion adjacent an edge portion of the other of said first and second end faces, to temporarily maintain the pad in an essentially helical configuration which temporarily reduces the diameter of the pad and facilitates insertion of the pad into the opening.

8. A method of disposing a vibration damping pad in an opening, the pad having an axially extending central through-hole which extends axially through the pad, the pad having a head section, a neck section that is coaxial and integral with the head section, and a body section that is coaxial and integral with the neck section, the pad including a generally annular groove between the head section and the body section and around the neck section, and an axially extending slit which continuously extends from the axially extending through hole to an outer surface of the pad to define juxtaposed first and second end faces, the first and second end faces being generally parallel with and spaced from a first plane containing an axis of the through hole, comprising the steps of:

distorting the pad so that the first and second end faces are separated with respect to one another essentially in the direction of the first plane;

temporarily locking the pad in a distorted configuration by engaging an upper corner portion of the first end face with a surface portion of the pad adjacent a lower edge portion of the second end face;

inserting the pad into the opening; and releasing the temporary locking engagement between the upper corner portion and the lower corner portion to allow the damper to reassume its normal configuration.

9. A method as set forth in claim 8, wherein the vibration damping pad has a generally oval-shaped cross-section.

* * * * *